A. I. CONRAD.
RAKE.
APPLICATION FILED DEC. 15, 1919.
1,339,436.
Patented May 11, 1920.
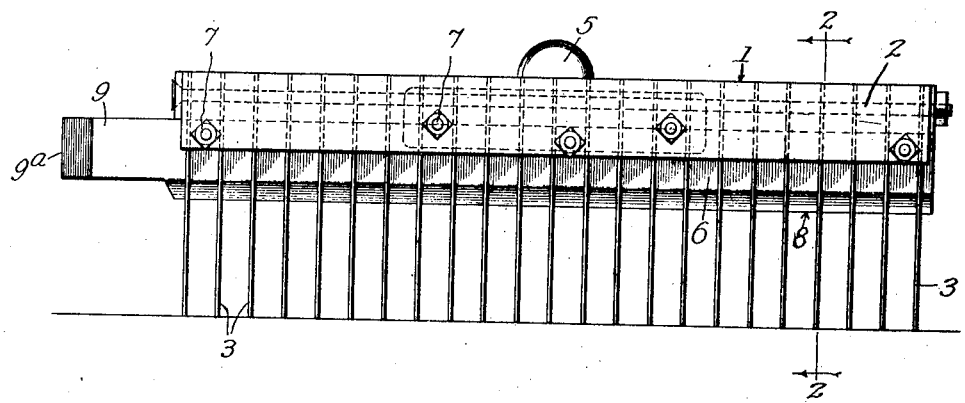
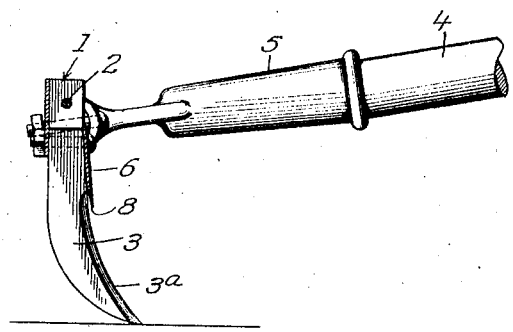
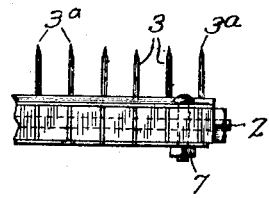
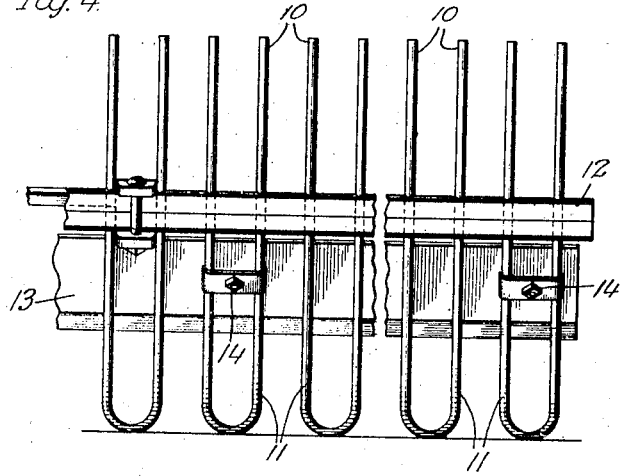
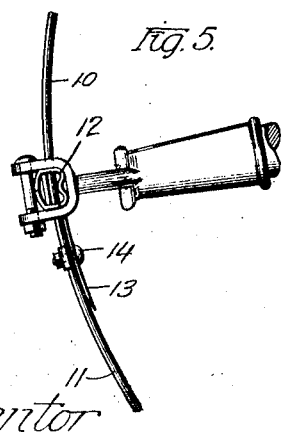
Inventor
Albert I. Conrad

UNITED STATES PATENT OFFICE.

ALBERT I. CONRAD, OF PASADENA, CALIFORNIA.

RAKE.

1,339,436.  Specification of Letters Patent.  Patented May 11, 1920.

Application filed December 15, 1919. Serial No. 345,106.

*To all whom it may concern:*

Be it known that I, ALBERT I. CONRAD, a citizen of the United States, and a resident of Pasadena, in the county of Los Angeles and State of California, have invented certain new and useful Improvements in Rakes, of which the following is a specification.

My invention relates in general to a rake but pertains more particularly to means associated with the ordinary types of lawn rakes, as well as a special form of rake for removing various noxious grasses or weeds from lawns.

In various parts of the United States, and no doubt elsewhere, and particularly in the city of Pasadena, California, the lawns are contaminated with certain creeping grasses or weeds, some of which are vine-like in character, and which must be removed or the lawn grass will eventually be exterminated and in any event its appearance ruined during the winter season by reason of these noxious grasses turning brown.

Heretofore it has been the custom to remove as much of such noxious growth as possible by means of an ordinary rake as well as hand-picking, but the process is very slow and difficult as the growth is very tenacious. A lawn mower has little, if any, effect upon this creeping growth as it passes over the noxious grass and only cuts the taller grass which projects through it.

One of the most pernicious growths in the district heretofore mentioned is commonly known as "Bermuda grass," while there also exists what is known as "quacking grass," as well as other noxious forms of grasses; the Bermuda grass being possibly the most difficult to eliminate.

The principal object of my invention is to provide a rake which will remove these noxious growths with as little labor as possible.

In the accompanying drawings—

Figure 1 is a view in elevation of a rake embodying the features of the invention, Fig. 2 is a cross-sectional view of the rake taken on line 2, 2 of Fig. 1, Fig. 3 is a fragmentary top plan view of the head of the rake, Fig. 4 is a modification of the invention showing a blade applied to the ordinary form of grass rake, and Fig. 5 is an end view of the rake shown in Fig. 4.

A rake embodying the features of my invention may be, in part, of the ordinary construction, namely, a head 1 comprising a cross-member or bar 2 to which are attached the tines 3 disposed along the cross-bar and arranged in parallel relation. A handle 4 is connected to the central portion of the cross-bar by means of an intermediate stock 5 suitably joined to the cross-bar and having a socket for receiving the end of the handle 4.

Extending transversely of the tines is a blade 6, preferably attached to the cross-bar on the face thereof adjacent the handle and which may be termed the front or forward face of the rake head. A number of bolts 7 passing through the upper margin of the blade and the cross-bar serve to join the members together. The blade is preferably secured in such a manner that it extends downwardly in contact with the tines 3, its lower edge 8 being sharpened and so positioned with relation to the tines 3 of the rake that the sharpened edge comes approximately midway between the cross-bar 2 and the ends of the tines.

The effect of this construction is that as the rake is pulled over the lawn the creeping growth is drawn against the sharpened edge of the blade, which cuts into the stalk or vine (without severing it) and consequently by pulling upon the rake the noxious growth is torn up by the roots and the rake thus carrying along the cut grass as well as the noxious grass, in the event that the lawn has been cut by the lawn mower before raking. The lawn may, of course, be raked first to remove the noxious grasses and then afterward the regular lawn grass cut with the mower. Where weeds or tall stalks of grass are present, the blade will either pull them up or cut them off completely.

In the case of Bermuda grass, the stalks or vines are thick and long and to remove the same I find it desirable to employ further means for overcoming these particular forms of weeds or grass set forth, namely, by adopting a blade-like form of tine 3, provided with sharpened front edges 3ª which cut the creeping stalks or vines of the Bermuda grass into sections and thus make it easier to remove a large number of smaller sections than a long, continuous vine, the long blade, however, crossing the tines performing the same function as heretofore described.

One end of the long blade may be provided with an extension 9, projecting beyond the tines and having its end 9ª sharpened and used as a tool for cutting the roots of growths, such as dandelions, and so forth, which may be present in the lawn and desirable to remove.

As has been already indicated, the use of a rake having the sharpened blade, as well as the sharpened tines, is particularly desirable in the removal of the long and creeping varieties of grass and weeds. However, for other varieties not having these particular characteristics the elimination of the sharpened tines may be resorted to without otherwise reducing the effectiveness of the rake. This, therefore, has led to a modification such as shown in Figs. 4 and 5, wherein is disclosed an ordinary form of grass rake, having double rows of wire tines 10 and 11 extending through and suitably connected to the cross-member 12. In this form the blade 13 is attached to the tines 11 immediately below the cross-bar 12, by means of suitable clamping or fastening members 14. The relative position of the blade 13 in the modified embodiment of the invention is the same in all respects to the blade 6 just described. Similarly, the function of the blade 13 and the method of handling the rake is quite the same as heretofore described.

By constructing a rake in the manner set forth it is possible to provide a tool that is effective in the removal of undesirable growths that otherwise are difficult of removal, it being borne in mind that the use of a sharpened blade is not so much a cutting implement as a means for gripping the stalks and enabling the roots to be torn from the ground, the only effectual means of permanently ridding the lawn of the weed.

Although I have shown and described the preferred forms of the device embodying my invention, it is to be understood that other modifications may be introduced without departing from the spirit of the invention, and, therefore, I do not wish to be limited except in so far as I have set forth the invention in the appended claims.

I claim as my invention:

1. In a rake, the combination of a handle, a cross-member, tines disposed along said cross-member, and a blade mounted on said cross-member and extending transversely of and in contact with the front faces of said tines, said blade having a sharpened lower edge disposed substantially midway between said cross-member and the ends of said tines.

2. In a rake, the combination of a handle, a cross-member, a plurality of tines disposed along said cross-member, and a blade extending transversely of said tines and provided with a sharpened lower edge disposed substantially midway of the ends of said tines, and an end portion extending laterally beyond said tines and having a sharpened lateral edge.

In witness whereof, I hereunto subscribe my name this 5th day of December, A. D. 1919.

ALBERT I. CONRAD.